Jan. 5, 1943.  E. W. RICKMEYER  2,307,731
CONTROL DEVICE
Filed Feb. 7, 1940  4 Sheets-Sheet 1
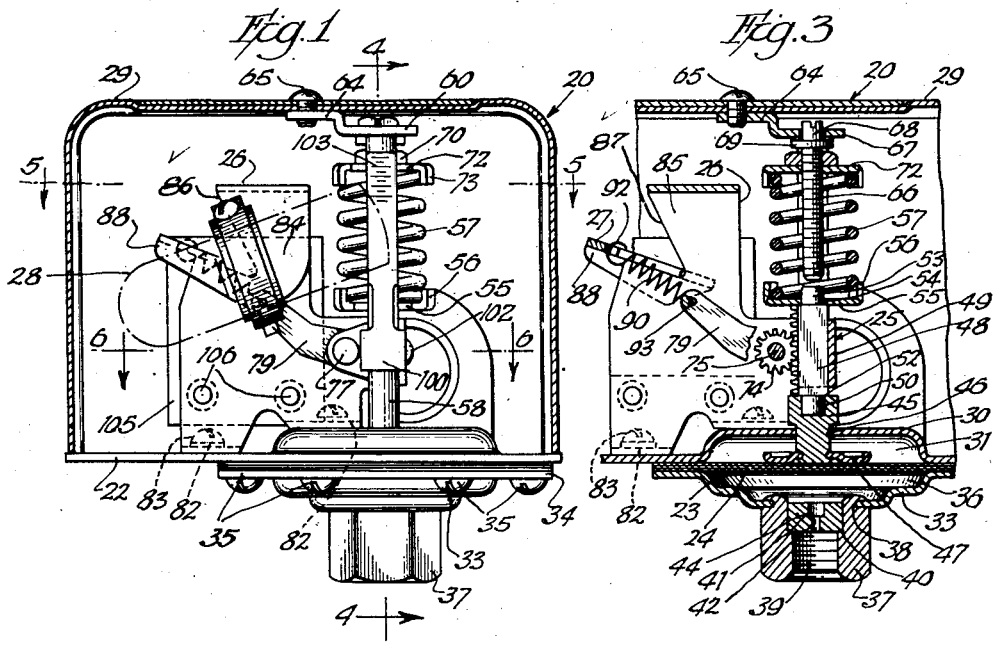
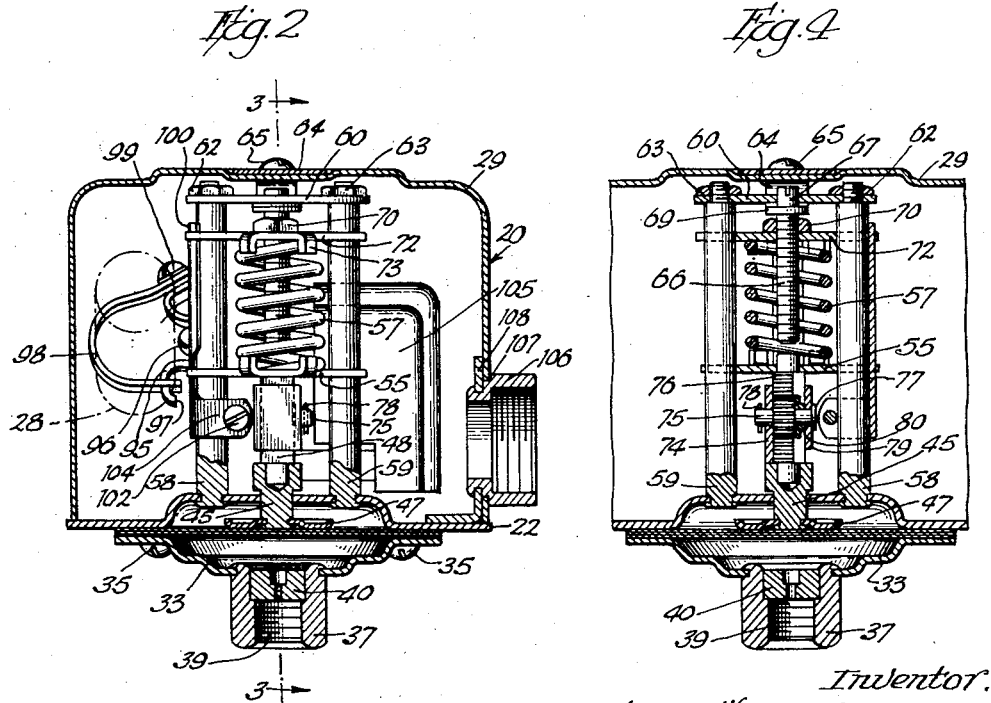

Jan. 5, 1943.  E. W. RICKMEYER  2,307,731
CONTROL DEVICE
Filed Feb. 7, 1940  4 Sheets—Sheet 2

Inventor:
Ernst Walter Rickmeyer
By:
H. Thrall Brewer
Atty.

Jan. 5, 1943.     E. W. RICKMEYER     2,307,731
CONTROL DEVICE
Filed Feb. 7, 1940     4 Sheets-Sheet 3
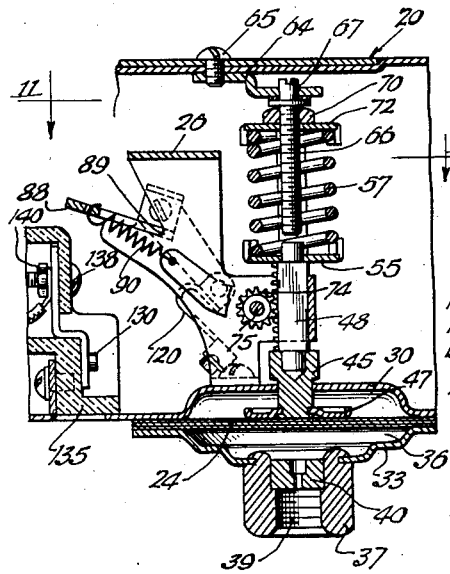
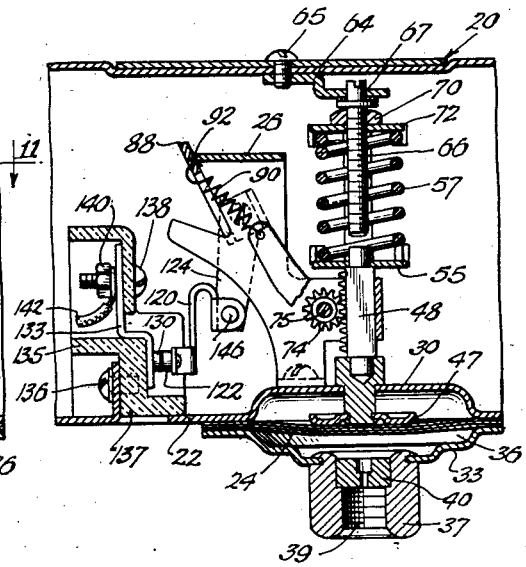
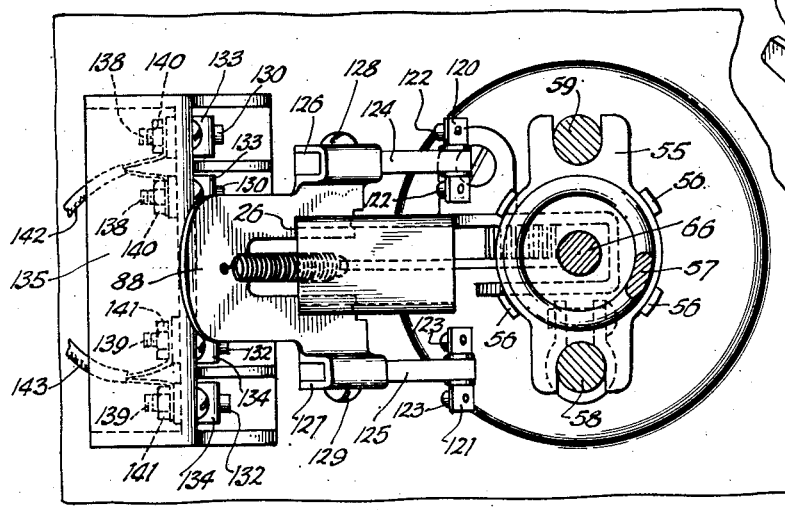
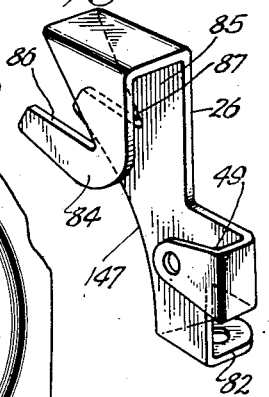
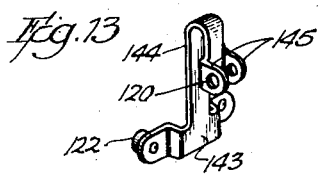
Inventor
Ernst Walter Rickmeyer
by
Atty.

Jan. 5, 1943.  E. W. RICKMEYER  2,307,731
CONTROL DEVICE
Filed Feb. 7, 1940  4 Sheets-Sheet 4

Inventor:
Ernst Walter Rickmeyer
By:
Atty.

Patented Jan. 5, 1943

2,307,731

UNITED STATES PATENT OFFICE 2,307,731

CONTROL DEVICE

Ernst Walter Rickmeyer, Elmhurst, Ill., assignor to Jefferson Electric Company, Bellwood, Ill., a corporation of Illinois Application February 7, 1940, Serial No. 317,773

7 Claims. (Cl. 200—83)

This invention relates to control devices, and more particularly to control devices which are actuated in response to a predetermined factor and are adapted to effect control of another factor in response to the first.

In the disclosed embodiments of this invention, the control devices are actuated in response to fluid pressure and are adapted to control an electrical circuit.

It is an object of this invention to provide a compact fluid pressure responsive switch which is dependable in operation and which embodies contact means operable with a snap action for controlling an electrical circuit.

Another object of this invention is to provide a switch actuated by fluid pressure which is adapted to be easily and quickly adjusted to vary the pressures at which the switch operates without appreciably changing the differential between the operating pressures.

Another object of this invention is to provide a switch adapted to be actuated by fluid pressure and having a mechanism so constructed and arranged that the parts of the control mechanism act directly upon one another.

Another object of this invention is to provide a control device adapted to be actuated by fluid pressure and also adapted, by the changing of one part, to have the range of operating pressures and/or the differential between operating pressures varied.

Another object of this invention is to provide a control device adapted to be actuated by fluid pressure and which, by the change of only a few parts, is adapted to effect control in response to fluid pressures above or below atmospheric pressure.

Another object of this invention is to provide a fluid pressure responsive switch in which a single manual adjustment alters the operating pressures of the switch and at the same time correspondingly varies the differential between the operating pressures.

Another object of this invention is to provide a fluid pressure responsive switch which is adapted, by the change of a few parts, to the use of either mercury or mechanical contacting elements for controlling an electrical circuit.

Other objects and advantages of this invention will be apparent from the following description and reference to the accompanying drawings wherein a preferred embodiment of my invention is clearly described and illustrated.

In the drawings:

Figs. 1 and 2 are respectively side and end views of a control device embodying a preferred form of this invention and having portions thereof shown in section, more clearly to illustrate the details of the structure;

Fig. 3 is a fragmentary sectional view with the section taken substantially on a line 3—3 of Fig. 2 and looking in the direction of the arrows;

Fig. 4 is a fragmentary sectional view with the section taken substantially on the line 4—4 of Fig. 1 and looking in the direction of the arrows;

Figure 5:
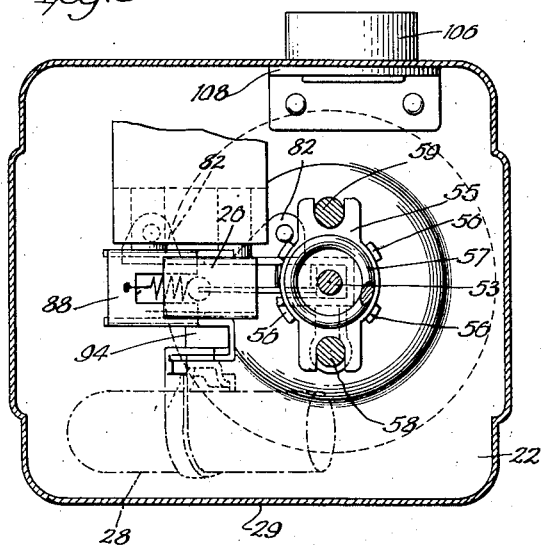
Figure 6:
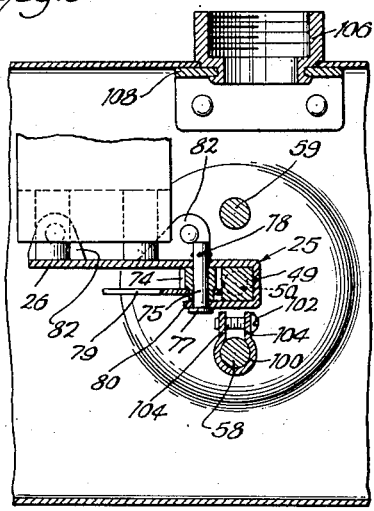
Figure 8:
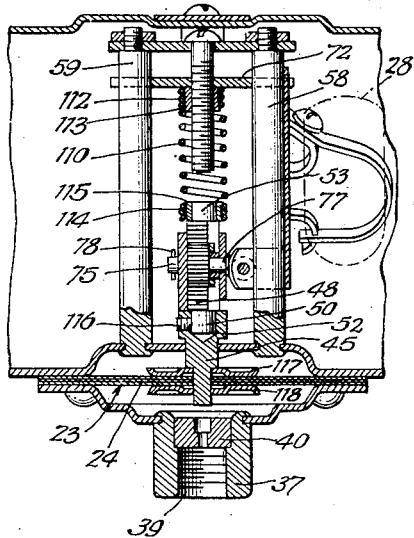
Figure 7:
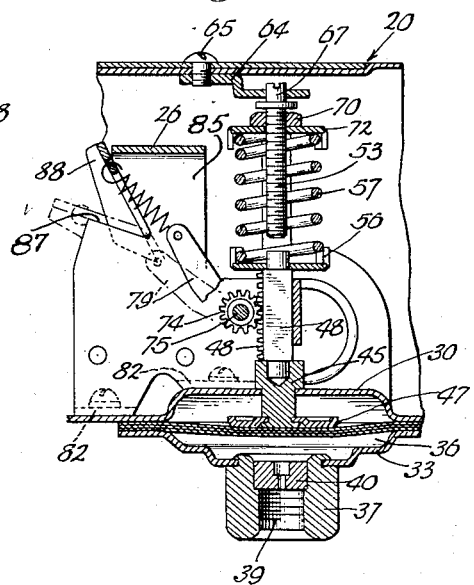

Figs. 5 and 6 are sectional views with the sections taken substantially on lines 5—5 and 6—6 respectively of Fig. 1 and looking in the direction of the arrows;

Fig. 7 is similar to Fig. 3 except that it illustrates different operating positions of the parts;

Fig. 8 is a view similar to that shown in Fig. 4, but illustrates a device which embodies a modification of a portion of the structure;

Figs. 9 and 10 are views similar to Figs. 3 and 7 respectively, but illustrate a modified form of the portion of the switch structure.

Figure 14:
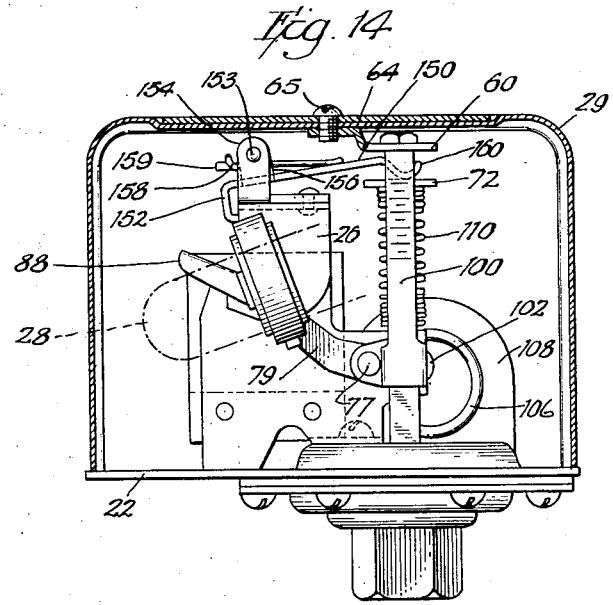

Fig. 11 is a fragmentary sectional view with the section taken substantially on the line 11—11 of Fig. 9 and looking in the direction of the arrows;

Figs. 12 and 13 are perspective views of parts of the illustrated control device;

Fig. 14 is a side view of a device incorporating a modification of this invention and has portions shown in section to clarify the disclosure of the structural features of the device.

Figure 15:
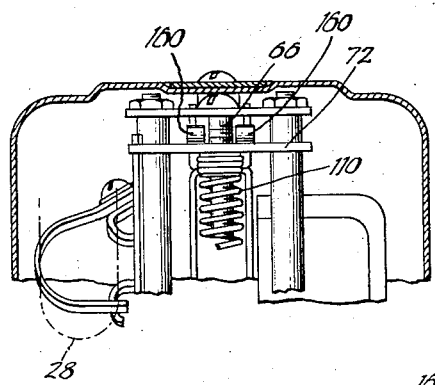
Figure 16:
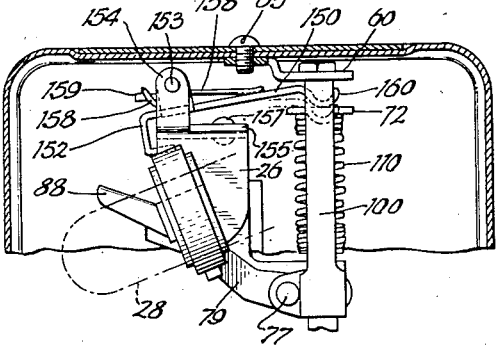
Figure 17:
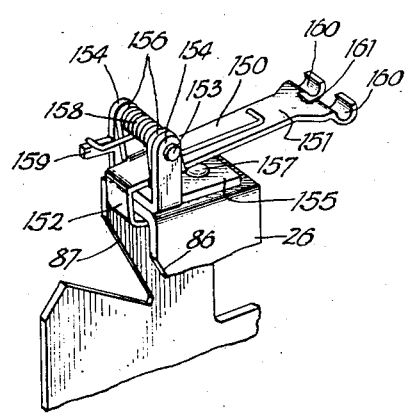

Fig. 15 is a fragmentary end view of a portion of the device shown in Fig. 14 with parts thereof in section to emphasize the structural features thereof;

Fig. 16 is a fragmentary side view of the device shown in Fig. 14 which indicates different operating positions of parts of the device;

Fig. 17 is a fragmentary perspective view of a portion of the device shown in Figs. 14, 15 and 16.

Throughout the several views illustrating this invention and modifications thereof, like reference numerals refer to similar parts. Having particular reference to Figs. 1 to 6 inclusive, a control device which is indicated generally at 20 has a base 22, actuating means 23 which in this instance includes a flexible diaphragm 24, a control mecahnism 25, a support 26, and switch means 27 which in this embodiment is adapted to include a mercury switch contacting device which is indicated by dot and dash lines at 28 in Figs. 1 and 5. A housing or cover 29 encloses the control mechanism 25, support 26 and switch means 27. The base 22 has an integral cupped or recessed portion 30 adjacent one side of the flexible diaphragm 24 to provide a chamber 31 adjacent one side of the portion of the diaphragm which is adapted to flex. A cupped member 33 having a flange 34 is secured to the base 22 opposite the cupped or recessed portion 30 by screws or fastening means 35 to provide a chamber 36 on the opposite side of the diaphragm 24 from the chamber 31. A coupling 37 is secured in an opening 38 in the cupped member 33, and is threaded at 39 to provide means for connecting the chamber 36 to a suitable or desired source of controlling fluid pressure. An orifice disc 40 having aligned communicating openings 41 and 42 which are preferably concentric with and smaller than the threaded opening 39 is preferably secured in a recess 44 in the coupling 37 to restrict fluid flow to and from the chamber 36 and thereby limit sudden fluctuations of the diaphragm 24 due to sudden variations in fluid pressure.

A stud 45 is slidably mounted in an opening 46 in the base 22, preferably concentric with respect to the flexible portion of the diaphragm 24, and has a disc 47 secured to the end thereof which rests against the surface of the diaphragm 24. A rack 48 is slidably mounted in a channel 49 which is preferably integrally formed in the support 26. This rack has a portion 50 of reduced section at one end thereof which fits into a recess 52 in the end of the stud 45. A portion 53 of reduced section at the other end of the rack extends through an opening 54 in a plate 55 which has integral upturned lugs 56 thereon and provides a support for one end of a coiled compression spring 57.

A pair of support posts 58 and 59 each have one end secured to the base 22 and are preferably located on opposite sides of the stud 45 and rack 48. An anchor plate 60 extends between and is secured to the other ends of the support posts 58 and 59 by nuts or fastening means 62 or 63 which are threaded onto the ends of the support posts. An offset arm 64 is integral with the anchor plate 60 and has the cover or housing 29 secured thereto by a screw or suitable fastening means 65. An adjusting screw 66 has a head portion 67 which extends through an opening 68 and the anchor plate 60 and has an integral flange 69 which engages the lower surface of the anchor plate. A nut 70 is threaded onto the adjusting screw 66 and engages a plate 72 which locates the end of the spring 57 opposite the plate 55. Lugs 73 on the plate 72 hold the spring 57 in place. The nut 70 is preferably secured to the plate 72 so that rotation of the adjusting screw 66 adjusts the position of the plate 72 and the compression or force of the spring 57. The plates 55 and 72 preferably have bifurcated ends which straddle the support posts 58 and 59 and are slidable with respect thereto.

A pinion gear 74 is secured to a shaft 75 which is rotatably supported by the support 26 with the teeth of the gear meshing with teeth 76 on the rack 48. The shaft 75 extends through openings in the support 26 adjacent the channel 49 and is held in place by a head 77 on one end thereof and a cotter pin 78 which extends through the other end thereof, or by other suitable means. A lever arm 79 is pressed onto and secured to a collar 80 which is preferably integral with one side of the pinion gear 74 and is rotatable with pinion 74 and shaft 75.

The support 26 has integral feet 82 which are secured to the base 22 by screws or suitable fastening means 83; and also, as more clearly shown in Fig. 12, has integral side portions 84 and 85 which are preferably substantially parallel. Adjacent and substantially V-shaped notches 86 and 87 in the side portions 84 and 85 provide a pivotal support for a switch toggle element 88; the toggle element 88 having edges such as 89 which are preferably sharp resting in the crotch of the substantially V-shaped notches 86 and 87. The sides of the notches 86 and 87 provide stops for limiting the angular movement of the toggle element 88. A tension spring 90 extends through an opening 92 in the toggle element 88 and through an opening 93 in the lever arm 79 to affect snap movement of the toggle element in response to movements of the lever arm when the action line of the spring 90 crosses the pivotal support axis of the toggle element 88.

A bracket 94 is preferably integral with one side of the toggle element 88 and has a clamp element 95 secured thereto by a screw or fastening means 96. A hooked end 97 of the clamping element 95 extends through an opening in one end of a strap 98 and the other end of the strap 98 is secured to the other end of the clamping element 95 by a screw or fastening means 99, so that the clamp 95 and strap 98 provide a clamp or support for securing the mercury switch 28 to the toggle element 88 for movement therewith.

A scale 100 which may be calibrated in suitable units for a particular control device is adjustably secured to the support post 58 by a screw or fastening means 102. Calibrations, such as those indicated at 103 are of a proper or suitable value to correspond to the range provided by the characteristics of the spring 57. Integral clamping lugs 104 are preferably provided for securing the scale 100 to the support post 58, and the position of the scale is preferably such that the ends of the plate 72 provide an indicator or pointer for indicating the adjustment of the device with respect to the scale 100.

A terminal block 105 of insulating material is secured to the support 26 by screws or fastening means 106, and is provided with suitable binding posts, not shown, for anchoring lead wires and making electrical connections to the switch. A conduit coupling 106 is secured in an opening 107 and the cover 29 to facilitate the wiring of the device through conduit. A re-enforcing plate 108 is preferably provided adjacent the inner surface of the cover 29 to strengthen the connection of the coupling thereto.

The switch illustrated in Figs. 1 to 7 inclusive has a compression spring 57, and is thereby adapted to be actuated by pressures above atmospheric; while the switch in Fig. 8 is modified to include a tension spring 110 and for actuation by pressures below atmospheric pressure. In this modification a collar 112 having a flanged edge 113 is secured to the plate 72 and a collar 114 having a flanged edge 115 is secured to the portion 53 of the rack 48. The lengths of the collars are such that a predetermined number of turns of the spring 110 surround the collars and the flanges 113 and 115 extend between the turns of the spring to anchor the ends thereof. In this form the portion 50 of the rack 48 is secured in the recess 52 by a set screw 116 which is threaded into the stud 45. Also, instead of the single disc 47, the flexible diaphragm 24 is clamped between a pair of discs 117 and 118 which are secured to the end of the stud 45.

In the modified form of this control device illustrated in Figs. 9 to 13 inclusive, the switching or electrical control is accomplished by mechanical or open contacts, rather than by the mercury switch contacting device which is illustrated in the previously described figures. In this form of the device, movable contact bridging elements 120 and 121 which respectively carry contacts 122 and 123 are carried by insulating arms 124 and 125. The arms 124 and 125 are secured in channels 126 and 127 respectively by screws or fastening means 128 and 129. The channels 126 and 127 are preferably integrally formed on opposite sides of the toggle element 88. The contacts 122 and 123 are in alignment with and adapted to engage stationary contacts 130 and 132 respectively, which stationary contacts are secured to terminal pieces 133 and 134 respectively and supported by an insulating terminal block 135. The terminal block 135 is secured to the base 22 by screws or fastening means 136 which extend through lugs 137 on the base and are threaded into the terminal block. Screws 138 and 139 having cooperating nuts 140 and 141 respectively provide binding posts on the terminals 133 and 134 to which lead wires such as 142 and 143 may be anchored.

As illustrated in Figures 10 and 13 the movable contact bridging elements 120 and 121 preferably have integral cross arms 143 and substantially U-shaped support arms 144. Lugs 145 are provided on the end of the U-shaped arm 144 opposite the cross arm 143 which straddle the arms 124 and 125 for securing the respective contact bridging elements thereto. Rivets or fastening means such as 146 extend through the lugs 145 and the arms for fastening the contact bridging elements thereto. The contacts 122 and 123 are carried at the ends of the cross arms 143 and are adapted to bridge a pair of stationary contacts 130 or 132. The substantially U-shaped support arm provides resilience in the contact support. Since the arms 124 and 125 are secured on opposite sides of the toggle element 88, the support 26 has only one foot 82 and is cut away at 147 to provide room for the swinging movement of the contact bridging elements 120 and 121.

In the modification illustrated in Figures 14 to 17 inclusive, a cam means is provided for effecting control of the switch means to correspond to the adjustment of the spring and thereby control of the differential between the operating pressures. The cam means 150 has an extending arm 151 and a curved cam surface 152, which cam surface serves as a stop for limiting movement of the toggle element 88 in one direction. A shaft 153 extends through lugs 154 on a support bracket 155 and lugs 156 on the arm 151 to rotatably support the cam means 150 with respect to the support bracket 155. The support bracket 155 is secured to the support 26 by a rivet or fastening means 157 in a position such that the curved portion of the cam means 150 is between the notches 86 and 87 and the cam surface 152 is in the path of movement of the toggle element 88. A spring 158 is coiled around the shaft 153 and has one end anchored on a projecting lug 159 and the other end pressing against the surface of the extending arm 151 to bias the cam means in one direction about the axis of the shaft 153. The extending arm 151 is notched at 161 and has curved fingers 160 at the sides of the notch. The adjusting screw 66 extends through the notch 161 in spaced relation with respect to the fingers 160, and the fingers 160 are biased against the surface of the plate 72 by the spring 158. Due to the biasing force of the spring 158, the cam means 150 follows movements of the plate 72 which are effected by the adjustment of the adjusting screw 66. The shape of the cam surface 152 controls the variation in the position of stopping the movement of the toggle element 88 which is effected by adjustment of the adjusting screw. The stop for the toggle element 88 which is provided by the cam surface 152 limits the movement of the toggle element in one direction and thereby decreases the necessary angular movement of the arm 79 for effecting movement of the toggle element from its position of rest against the cam surface 152. This controls the differential between the operating pressures of the device for a given control spring such as 57 or 110. In the disclosed device, the cam surface 152 is so shaped that it tends to decrease the differential between the operating pressures below what it would be without the cam means 150 and also tends to decrease the differential between the operating pressures as the operating pressures are increased by adjustment of the screw 66.

In the structure and operation of the preferred embodiment of this invention, it is desirable that the parts comprising the control mechanism, and particularly the disc 47, stud 45, rack 48, adjusting screw 66 and the action line of the control spring 57 or 110 should be in substantial alignment. This simplifies the structure by the elimination of additional linkages which are necessary if the parts are not in alignment. It is also preferable that the axis of alignment of the parts of the control mechanism are substantially coaxial with respect to the center of the flexible diaphragm 24. This provides maximum movement for a given flexure of the diaphragm.

When a source of actuating fluid presure is connected to the control device through the coupling 37, the pressure within the chamber 36 and the force of the spring 57 or 110 control the position and flexure of the flexible diaphragm 24. Movement of the diaphragm which is effected by the change of fluid pressure in the chamber 36 moves the rack 48, pinion 74 and lever arm 79 to actuate the toggle element 88. The toggle element 88 moves from one of its positions of rest to the other with snap action to control the contact means which may be either the mercury tube contact device 28, contact bridging elements 120 and 121 or other suitable circuit controlling instrumentalities.

With the structure disclosed, it is a relatively simple and easy matter to change the spring 57 or 110 to thereby change the pressure rating or calibration of the switch structure. The calibration of the scale 100 should, of course, correspond to the spring which is in use on the device and should be set to a proper position for indicating the operating pressure to which the device is adapted.

Since some movement of the control mechanism is required for effecting actuation of the toggle element from one of its positions of rest to the other, there is a differential between the operating pressures which effect movement of the toggle element in the opposite directions. For a given spring 57 or 110, and when a cam means such as that shown in Figs. 14 to 17 inclusive is not used, the differential between the operating pressures remains practically constant for different settings of the spring tension which are effected by adjustment of the screw 66. The adjustment of the screw 66 does, of course, change the operating pressures of the device within limits for a particular spring 57 or 110. The structure disclosed in Figs. 14 to 17 inclusive is utilized where control of the differential between the operating pressures is desired and this structure provides a control which is automatically effected at the time the pressure control is adjusted.

While the embodiment of the present invention which is herein disclosed constitutes a preferred form, it is to be understood that other forms might be adopted, all of which come within the scope of the claims which follow.

What is claimed is:

1. A control device comprising, in combination, a flexible diaphragm, means supporting said diaphragm so that flexure thereof is effected by variations in fluid pressure, a rack, means slidably supporting the rack, an actuating stud engaging the rack and movable responsive to flexure of the diaphragm, a coil spring adapted to control movements of the rack effected by flexure of the diaphragm, means for adjusting the normal force of the coil spring, said actuating stud, said rack and the action line of said coil spring being substantially in alignment and concentric with respect to said diaphragm, a switch element pivotally supported for movement to two positions, a pinion cooperatively associated with said rack, a lever arm controlled by the pinion, and a spring connecting the lever arm and switch element so that movements of the lever arm move the switch element to and from said two positions with snap action.

2. A control device comprising, in combination, a flexible diaphragm, means supporting said diaphragm so that flexure thereof is effected by variations in fluid pressure, a rack, means slidably supporting the rack, an actuating stud engaging the rack and movable responsive to flexure of the diaphragm, a coil spring adapted to control movements of the rack effected by flexure of the diaphragm, means for adjusting the normal force of the coil spring, said actuating stud, said rack and the action line of said coil spring being substantially in alignment and concentric with respect to said diaphragm, a pinion cooperatively associated with said rack, and switch means operated by movements of the pinion.

3. A control device comprising, in combination, a base, support means secured to the base, a flexible diaphragm supported by the base so that flexure thereof is effected by variations in fluid pressure, a rack supported by said support means for linear movement with respect thereto, means intermediate the rack and diaphragm and connecting said rack and diaphragm so that flexure of the diaphragm moves the rack, a spring biasing the rack in one direction, means for adjusting the normal force of the spring, the axis of movement of said rack and the action line of said spring being substantially concentric with respect to the diaphragm, a pinion rotatably supported by said support means in cooperative relation with respect to the rack and actuated by movement of the rack, switch means rotatably supported by the support means, an arm secured to the pinion and movable therewith, and means effecting snap movement of the switch means responsive to movements of the arm.

4. A control device comprising, in combination, a base, support means secured to the base, fluid pressure responsive means supported by the base, a rack movably supported by the support means, means connecting the rack and pressure responsive means so that movement of the pressure responsive means moves the rack, a spring controlling movements of the rack, means for adjusting the normal force of the spring, a pinion rotatably supported by said support means and adapted to be actuated by movement of the rack, movable switch means supported by the support means, a switch actuating member actuated by the pinion, and means effecting snap movement of the movable switch means responsive to movements of the switch actuating member.

5. A control device comprising, in combination, a base, support means secured to the base, fluid pressure responsive means supported by the base, a rack movably supported by the support means, means connecting the rack and pressure responsive means so that movement of the pressure responsive means moves the rack, support posts adjacent the rack and secured to the base, a spring supported between said posts for controlling movements of the rack, means for adjusting the normal force of the spring, a pinion rotatably supported by said support means and adapted to be actuated by movement of the rack, movable switch means supported by the support means, a switch actuating member actuated by the pinion, and means effecting snap movement of the movable switch means responsive to movements of the switch actuating member.

6. In a control device, the combination comprising, support means having a channel, a rack slidably mounted for linear movement in said channel, a pinion rotatably supported by said support means and meshing with the rack, a switch control arm secured to said pinion, a switch member pivotally supported by said support means and having contact means adapted to be actuated thereby, and a spring connecting said switch control arm and switch member for effecting snap movement of the switch member responsive to movements of the switch control arm.

7. In a control device, the combination comprising, support means having a channel, a rack slidably mounted for linear movement in said channel, a pinion rotatably supported by said support means and meshing with the rack, a switch control arm secured to said pinion, a switch member pivotally supported by said support means and having contact means adapted to be actuated thereby, a spring connecting said switch control arm and switch member for effecting snap movement of the switch member responsive to movements of the switch control arm and adjustable cam means rotatably secured to said support means for stopping movement of the switch member in one direction.

ERNST WALTER RICKMEYER.